United States Patent
Yang et al.

(10) Patent No.: US 10,915,209 B2
(45) Date of Patent: Feb. 9, 2021

(54) LIQUID DETECTING METHOD AND CONTROLLER FOR A CAPACITIVE TOUCH PAD

(71) Applicant: ELAN MICROELECTRONICS CORPORATION, Hsin Chu (TW)

(72) Inventors: Tung-Ming Yang, Xihu Township, Changhua County (TW); Hsueh-Wei Yang, Zhubei (TW); Tien-Wen Pao, Zhubei (TW)

(73) Assignee: Elan Microelectronics Corporation, Hsinchu (TW)

( * ) Notice: Subject to any disclaimer, the term of this patent is extended or adjusted under 35 U.S.C. 154(b) by 1 day.

(21) Appl. No.: 16/432,573

(22) Filed: Jun. 5, 2019

(65) Prior Publication Data
US 2019/0377455 A1 Dec. 12, 2019

(30) Foreign Application Priority Data

Jun. 12, 2018 (TW) .............................. 107120228 A
Dec. 14, 2018 (TW) .............................. 107145275 A

(51) Int. Cl.
*G06F 3/041* (2006.01)
*G06F 3/044* (2006.01)
(Continued)

(52) U.S. Cl.
CPC ........ *G06F 3/0443* (2019.05); *G06F 3/03547* (2013.01); *G06F 3/047* (2013.01); *G06F 3/0416* (2013.01)

(58) Field of Classification Search
CPC ........... G06F 3/044; G06F 2203/04104; G06F 3/0445; G06F 3/04186; G06F 3/04182; G06F 11/00; G06F 1/3231; G06F 2200/1636; G06F 3/04166; G06F 3/0412; G06F 3/0416; G06F 3/041662; H04M 2250/12; H04M 1/7253; H04M 19/04;
(Continued)

(56) References Cited

U.S. PATENT DOCUMENTS 9,904,427 B1 * 2/2018 Co .......................... G06F 3/044
10,345,976 B2 * 7/2019 Fang ..................... G06F 3/0446
(Continued)

FOREIGN PATENT DOCUMENTS

TW 201430663 A 8/2014
TW I502422 B 10/2015
(Continued)

*Primary Examiner* — Duc Q Dinh
(74) *Attorney, Agent, or Firm* — Muncy, Geissler, Olds & Lowe, P.C.

(57) ABSTRACT

A liquid detecting method and controller for a capacitive touch pad are disclosed. The method includes performing a first mutual capacitance measurement of sensing points of the capacitive touch pad to obtain multiple first sensing values, and then performing a second mutual capacitance measurement of the sensing points to obtain multiple second sensing values, wherein the first and the second mutual capacitance measurements using different frequency of driving signals or different sensing periods for sensing the multiple sensing points. According to the multiple first sensing values and the second sensing values, whether there is liquid on the capacitive touch pad can be determined.

20 Claims, 12 Drawing Sheets

(51) Int. Cl.
*G06F 3/0354* (2013.01)
*G06F 3/047* (2006.01)

(58) Field of Classification Search
CPC .... H04M 1/0266; H04M 1/0268; H04M 1/67; H04M 1/72566; H04M 1/72569; H04M 1/72572; H04M 1/72597; H04M 2250/10; H04M 2250/22
USPC .................................................. 345/173–175
See application file for complete search history.

(56) References Cited

U.S. PATENT DOCUMENTS

| 10,409,409 B2 * | 9/2019 | Noguchi ............... G06F 3/0418 |
| 2017/0277345 A1 | 9/2017 | Agematsu |

FOREIGN PATENT DOCUMENTS

| TW | I585664 B | 6/2017 |
| TW | 201741845 A | 12/2017 |

\* cited by examiner

FIG.9A

| | X1 | X2 | X3 | X4 | X5 | X6 | X7 | X8 | X9 | X10 | X11 | X12 | |
|---|---|---|---|---|---|---|---|---|---|---|---|---|---|
| | 0 | 0 | 8 | 4 | 16 | 12 | 4 | 16 | 4 | -4 | 4 | 4 | Y1 |
| | 0 | -4 | -8 | -4 | 8 | 0 | 0 | 4 | 0 | 0 | -4 | -4 | Y2 |
| | 4 | 8 | 228 | 596 | 636 | 212 | 28 | 4 | 8 | 8 | 8 | 4 | Y3 |
| | 4 | 164 | 728 | 736 | 744 | 616 | 228 | 20 | 16 | 4 | 0 | 8 | Y4 |
| | 8 | 356 | 756 | 744 | 752 | 716 | 416 | 32 | 16 | 4 | 4 | 8 | Y5 |
| | 8 | 208 | 744 | 748 | 680 | 200 | 84 | 20 | 12 | 4 | 0 | 4 | Y6 |
| | 0 | 12 | 196 | 336 | 124 | 24 | 20 | 12 | 12 | 0 | 0 | 4 | Y7 |
| | 0 | 4 | 8 | 8 | 8 | 8 | 4 | 8 | 8 | 4 | 0 | 0 | Y8 |
| | 24 | 748 | 2660 | 3168 | 2968 | 1788 | 784 | 116 | 76 | 20 | 12 | 28 | Sum1_X |

400A points to X3 column; 300A points to X7 column.

FIG.9B

| | X1 | X2 | X3 | X4 | X5 | X6 | X7 | X8 | X9 | X10 | X11 | X12 | |
|---|---|---|---|---|---|---|---|---|---|---|---|---|---|
| | 0 | 0 | 8 | 8 | 20 | 20 | 12 | 4 | 4 | 0 | -4 | 0 | Y1 |
| | -4 | 0 | -4 | 0 | 8 | 12 | 4 | 0 | 0 | 8 | 0 | 0 | Y2 |
| | 8 | -28 | -68 | 132 | 156 | 96 | 20 | 16 | 12 | 16 | 8 | 12 | Y3 |
| | 4 | 12 | 20 | 116 | 192 | 356 | 156 | 24 | 12 | 8 | 4 | 8 | Y4 |
| | 12 | 104 | -28 | 92 | 188 | 416 | 260 | 24 | 8 | 8 | 0 | 8 | Y5 |
| | 0 | 8 | -32 | 76 | 128 | 96 | 48 | 12 | 0 | -8 | -8 | -8 | Y6 |
| | 8 | -12 | 0 | 104 | 24 | 24 | 24 | 12 | 8 | 8 | 0 | 8 | Y7 |
| | 0 | 0 | 8 | 16 | 16 | 12 | 8 | 0 | 4 | 0 | 0 | 0 | Y8 |
| | 28 | 84 | -96 | 544 | 732 | 1032 | 532 | 92 | 48 | 40 | 0 | 28 | Sum2_X |
| | 49 | 146 | -166 | 943 | 1268 | 1788 | 922 | 159 | 83 | 69 | 0 | 49 | Normalized_Sum2_X |

400A points to X3 column; 300A points to X7 column.

|  | X1 | X2 | X3 | X4 | X5 | X6 | X7 | X8 | X9 | X10 | X11 | X12 |  |
|---|---|---|---|---|---|---|---|---|---|---|---|---|---|
| | 0 | 0 | 14 | 14 | 34 | 34 | 21 | 7 | 7 | 0 | -7 | 0 | Y1 |
| | -7 | 0 | -7 | 0 | 14 | 21 | 7 | 0 | 0 | 14 | 0 | 0 | Y2 |
| | 14 | -48 | -117 | 227 | 269 | 165 | 34 | 28 | 21 | 28 | 14 | 21 | Y3 |
| | 7 | 21 | 34 | 200 | 330 | 613 | 269 | 41 | 21 | 14 | 7 | 14 | Y4 |
| | 21 | 179 | -48 | 158 | 324 | 716 | 448 | 41 | 14 | 14 | 0 | 14 | Y5 |
| | 0 | 14 | -55 | 131 | 220 | 165 | 83 | 21 | 0 | -14 | -14 | -14 | Y6 |
| | 14 | -21 | 0 | 179 | 41 | 41 | 41 | 21 | 14 | 14 | 0 | 14 | Y7 |
| | 0 | 0 | 14 | 28 | 28 | 21 | 14 | 0 | 7 | 0 | 0 | 0 | Y8 |

FIG.12A

|  | X1 | X2 | X3 | X4 | X5 | X6 | X7 | X8 | X9 | X10 | X11 | X12 |  |
|---|---|---|---|---|---|---|---|---|---|---|---|---|---|
| | 0 | 0 | -6 | -10 | -18 | -22 | -17 | 9 | -3 | -4 | 11 | 4 | Y1 |
| | 7 | -4 | -1 | -4 | -6 | -21 | -7 | 4 | 0 | -14 | -4 | -4 | Y2 |
| | -10 | 56 | 345 | 369 | 368 | 47 | -6 | -24 | -13 | -20 | -6 | -17 | Y3 |
| | -3 | 143 | 694 | 536 | 414 | 3 | -41 | -21 | -5 | -10 | -7 | -6 | Y4 |
| | -13 | 177 | 804 | 586 | 428 | 0 | -32 | -9 | 2 | -10 | 4 | -6 | Y5 |
| | 8 | 194 | 799 | 617 | 460 | 35 | 1 | -1 | 12 | 18 | 14 | 18 | Y6 |
| | -14 | 33 | 196 | 157 | 83 | -17 | -21 | -9 | -2 | -14 | 0 | -10 | Y7 |
| | 0 | 4 | -6 | -20 | -20 | -13 | -10 | 8 | 1 | 4 | 0 | 0 | Y8 |

FIG.12B

LIQUID DETECTING METHOD AND CONTROLLER FOR A CAPACITIVE TOUCH PAD

CROSS REFERENCE TO RELATED APPLICATIONS

This non-provisional application claims the benefit under 35 U.S.C. § 119(a) to Patent Application No. 107120228 filed in Taiwan on Jun. 12, 2018 and Paten Application No. 107145275 filed in Taiwan on Dec. 14, 2018, all of which are hereby expressly incorporated by reference into the present application.

BACKGROUND OF THE INVENTION

1. Field of the Invention

The present invention relates to a touch pad, more particularly, to a liquid detection method for a capacitive touch pad.

2. Description of the Related Art

Capacitive touch pad determines touch information of objects, for example types of the objects and touch positions, according to variations of capacitance. When there is liquid such as water on the touch pad and a user's finger contacts the liquid, a conventional controller of the touch pad is unable to effectively recognize that there is liquid on the touch pad.

SUMMARY OF THE INVENTION

An objective of the present invention is to provide a liquid detecting method for determining whether there is liquid on a touch pad.

According to the present invention, the liquid detecting method is for a capacitive touch pad, wherein the capacitive touch pad comprises multiple first electrodes and multiple second electrodes, and multiple sensing points are formed at intersections of the multiple first electrodes and the multiple second electrodes. The method comprises steps of:

performing a first mutual capacitance measurement of the multiple sensing points with a first driving signal having a first frequency to obtain multiple first sensing values of the multiple sensing points;

performing a second mutual capacitance measurement of the multiple sensing points with a second driving signal having a second frequency to obtain multiple second sensing values of the multiple sensing points, the second frequency being higher than the first frequency; and determining whether there is liquid on the capacitive touch pad according to the multiple first sensing values and the multiple second sensing values.

According to the present invention, the liquid detecting method is for a capacitive touch pad, wherein the capacitive touch pad comprises multiple first electrodes and multiple second electrodes, and multiple sensing points are formed at intersections of the multiple first electrodes and the multiple second electrodes. The method comprises steps of:

performing a first mutual capacitance measurement of the multiple sensing points, which comprises to sense each of the multiple sensing points for a first period of time to obtain multiple first sensing values of the multiple sensing points;

performing a second mutual capacitance measurement of the multiple sensing points, which comprises to sense each of the multiple sensing points for a second period of time to obtain multiple second sensing values of the multiple sensing points, wherein the second period of time is less than the first period of time; and determining whether there is liquid on the capacitive touch pad according to the multiple first sensing values and the multiple second sensing values.

Other objectives, advantages and novel features of the invention will become more apparent from the following detailed description when taken in conjunction with the accompanying drawings.

BRIEF DESCRIPTION OF THE DRAWINGS

FIG. 9A shows first sensing values obtained by performing a first mutual capacitance measurement of the touch pad in accordance with the present invention;

FIG. 9B shows second sensing values obtained by performing a second mutual capacitance measurement of the touch pad in accordance with the present invention;

FIG. 12A shows second normalized values obtained by normalizing the second sensing values in FIG. 9B; and FIG. 12B shows second difference values obtained by subtracting the second normalized values in FIG. 12A from the first sensing values in FIG. 9A.

DETAILED DESCRIPTION OF THE INVENTION

Figure 1:
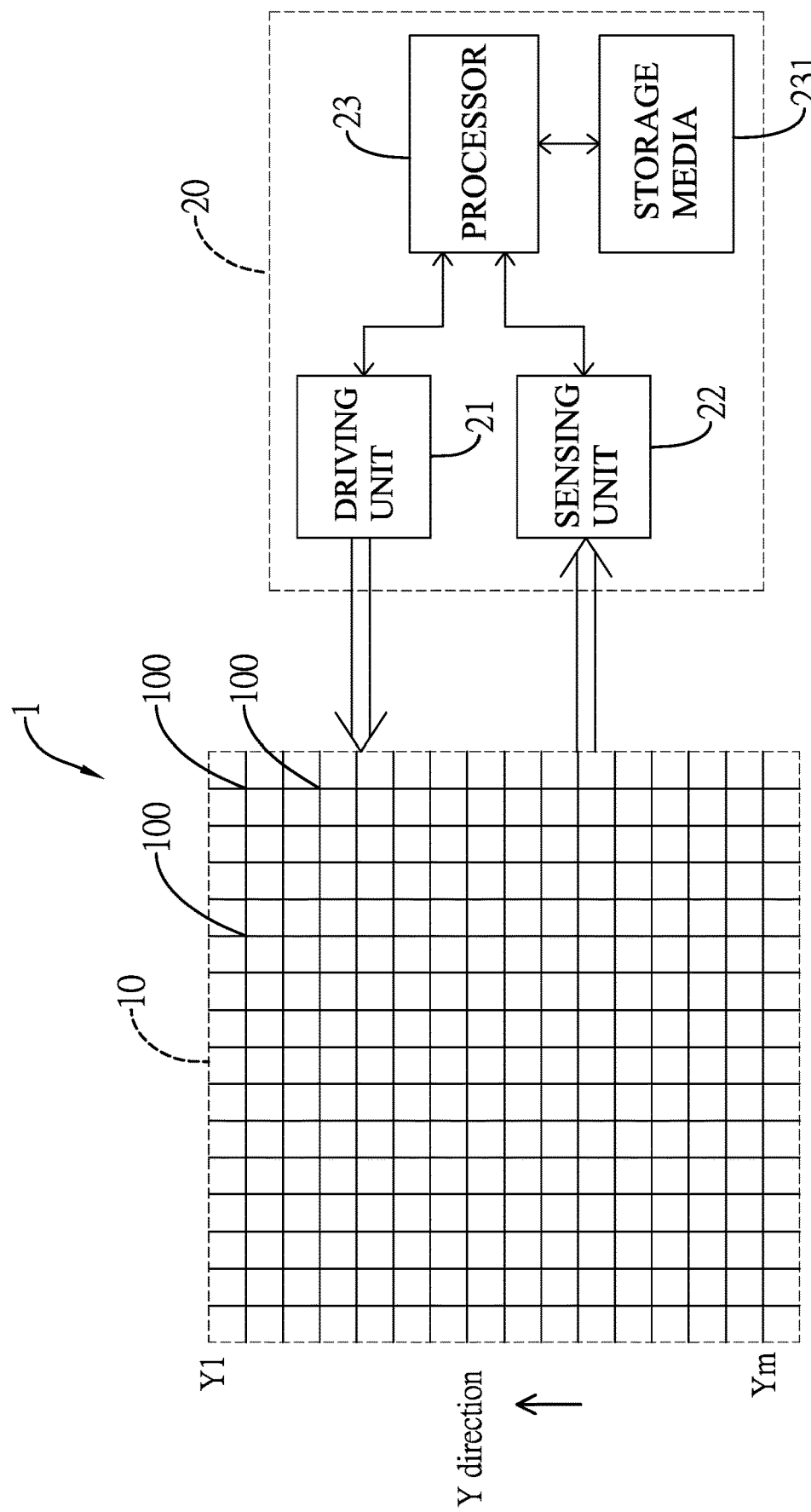
FIG. 1 shows a configuration of a capacitive touch device.

With reference to FIG. 1, a capacitive touch device 1 comprises a capacitive touch pad 10 (hereinafter touch pad 10) and a controller 20 coupled to the touch pad 10. The touch pad 10 may be transparent or opaque. The touch pad 10 comprises multiple sensing points 100 which can be implemented with different configurations. For example, as shown in FIG. 1, the touch pad 10 comprises multiple first electrodes X1-Xn extending in a Y direction and multiple second electrodes Y1-Ym extending in an X direction, wherein there are n×m sensing points 100 formed at intersections of the multiple first electrodes X1-Xn and the multiple second electrodes Y1-Ym. The names, positions and numbers of the multiple first electrodes X1-Xn and the multiple second electrodes Y1-Ym in FIG. 1 are for illustrative purpose only, and are not intend to limit the present invention.

The controller 20 is used to detect sensing values of the multiple sensing points 100. The controller 20 comprises a driving unit 21, a sensing unit 22, a processor 23 and a storage media 231. The processor 23 is coupled to the driving unit 21, the sensing unit 22 and the storage media 231 for controlling operations of the driving unit 21, the sensing unit 22 and the storage media 231. The storage media 231 may be DRAM (Dynamic Random Access Memory), SRAM (Static Random Access Memory), Flash memories, etc. A firmware program is stored in the storage media 231. The processor 23 implements the liquid detection method of the present invention by executing the firmware program in the storage media 231. The driving unit 21 is used to provide a driving signal for driving the multiple first electrodes X1-Xn, and the sensing unit 22 is used to sense the multiple second electrodes Y1-Ym to obtain the sensing values of the multiple sensing points 100.

Figure 2:
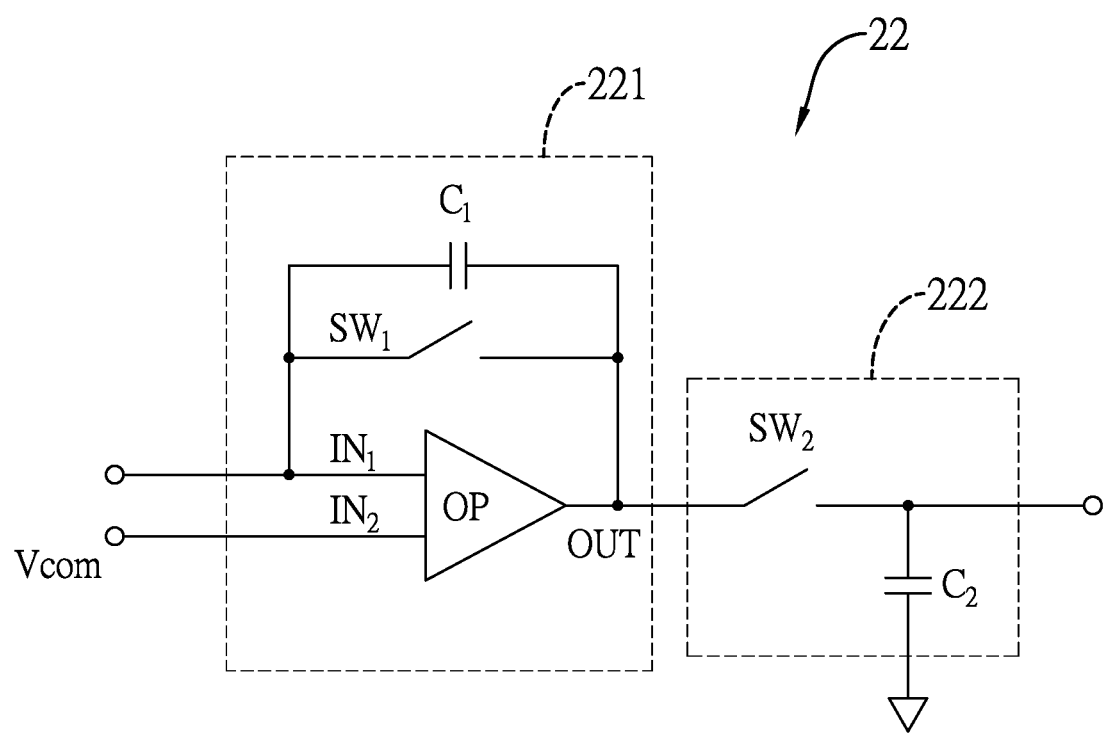
FIG. 2 shows a sensing circuit and a sample and hold circuit in a sensing unit in accordance with the present invention.

With reference to FIG. 2, according to one embodiment, the sensing unit 22 comprises at least one sensing circuit 221 and at least one sample and hold circuit 222. The sensing circuit 221 comprises a sensing capacitor $C_1$, a switch $SW_1$ and an operational amplifier OP. The sensing capacitor $C_1$ is coupled between a first input terminal $IN_1$ and an output terminal OUT of the operational amplifier OP. The switch $SW_1$ is coupled to the sensing capacitor $C_1$ in parallel. The output terminal OUT of the operational amplifier OP is coupled to the sample and hold circuit 222. The sample and hold circuit 222 comprises a switch $SW_2$ and a sampling capacitor $C_2$. One end of the switch $SW_2$ is coupled to one end of the sampling capacitor $C_2$ and an output terminal of the sample and hold circuit 222, and another end of the switch $SW_2$ is coupled to the output terminal OUT of the operational amplifier OP. Another end of the sampling capacitor $C_2$ is coupled to ground. A second input terminal $IN_2$ of the operation amplifier OP is coupled to a common voltage Vcom.

Before sensing a sensing point 100, the switch $SW_1$ is turned on, so that charge amount of the sensing capacitor $C_1$ is zeroed. When sensing the sensing point 100, the switch $SW_1$ is open and the switch $SW_2$ is turned on, and the first input terminal $IN_1$ of the operational amplifier OP is coupled to the sensing point 100 via the second electrodes Y1-Ym to sense capacitance of the sensing point 100. As the sensing point 100 is driven by the driving signal TX, there is voltage variation at the output terminal OUT of the operational amplifier OP. When the switch $SW_2$ is turned on, the voltage at the output terminal OUT of the operational amplifier OP charges the sampling capacitor $C_2$, so that a voltage of the sampling capacitor $C_2$ reaches to the voltage at the output terminal OUT of the operational amplifier OP.

The voltage of the sampling capacitor $C_2$ is associated with a time length RT in which the switch $SW_2$ is turned on. In one embodiment, the time length RT is determined based on a required time that the output voltage at the output terminal OUT of the operational amplifier OP reaches to a stable status. In other embodiments, the time length RT can be shortened so that the switch $SW_2$ is open before the output voltage at the output terminal OUT of the operational amplifier OP reaching to the stable status. After the switch $SW_2$ is open, the voltage of the sampling capacitor $C_2$ is applied to determine the sensing value of the sensing point 100.

The voltage of the sampling capacitor $C_2$ is converted to a digital value by an analog to digital converter. In one embodiment, the sensing value of the sensing point 100 is obtained by subtracting a reference value from the digital value, wherein the reference value is a digital value output by the analog to digital converter when no object contacts or approaches the touch pad 10. The multiple sensing points 100 may have different reference values respectively. Further, for different driving signals, the reference values may also be different.

Figure 3:
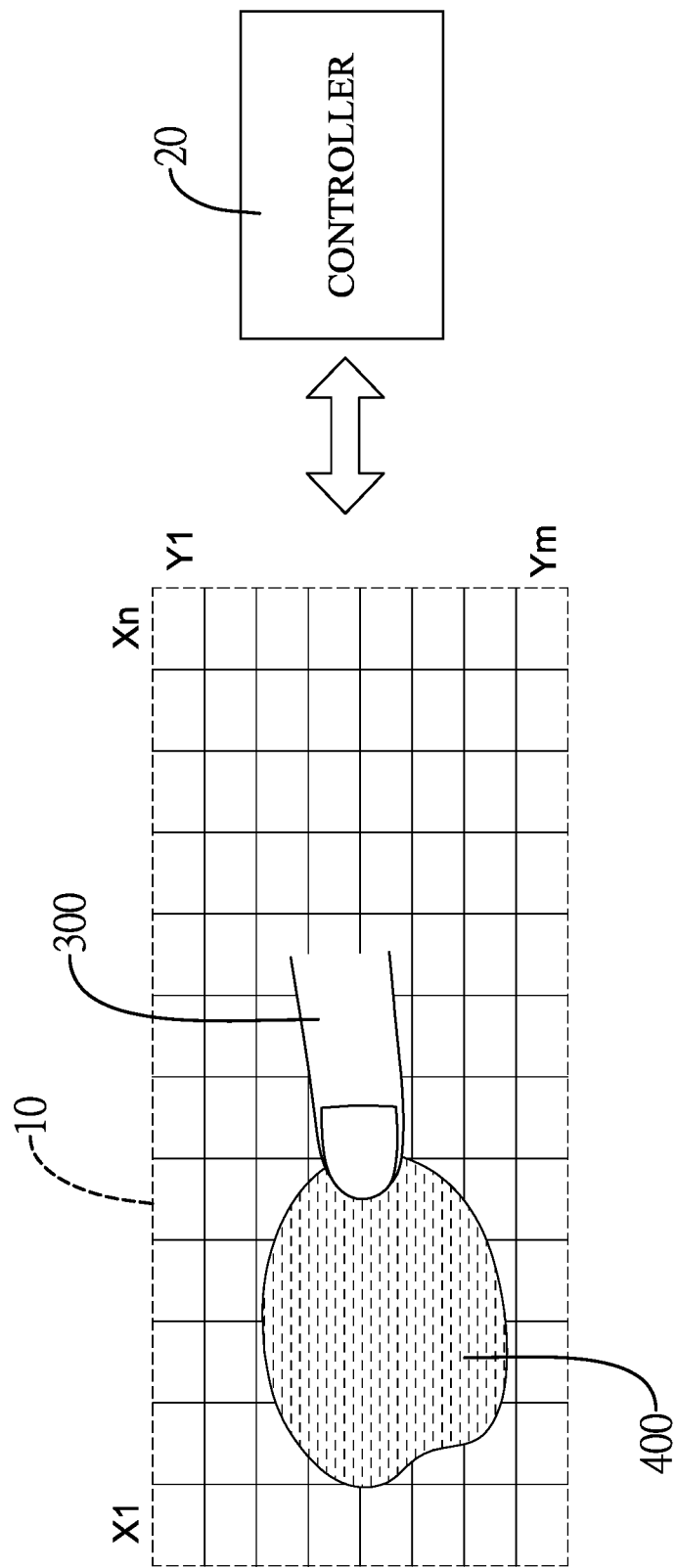
FIG. 3 shows that there is liquid on a touch pad.

FIG. 3 shows a finger 300 and liquid 400 such as water on the touch pad 10, wherein the finger 300 contacts the liquid 400 so that the liquid 400 is grounded. As an example, the touch pad 10 comprises the first electrodes X1-X12 arranged in an X direction and the second electrodes Y1-Y8 arranged in a Y direction.

Figure 4:
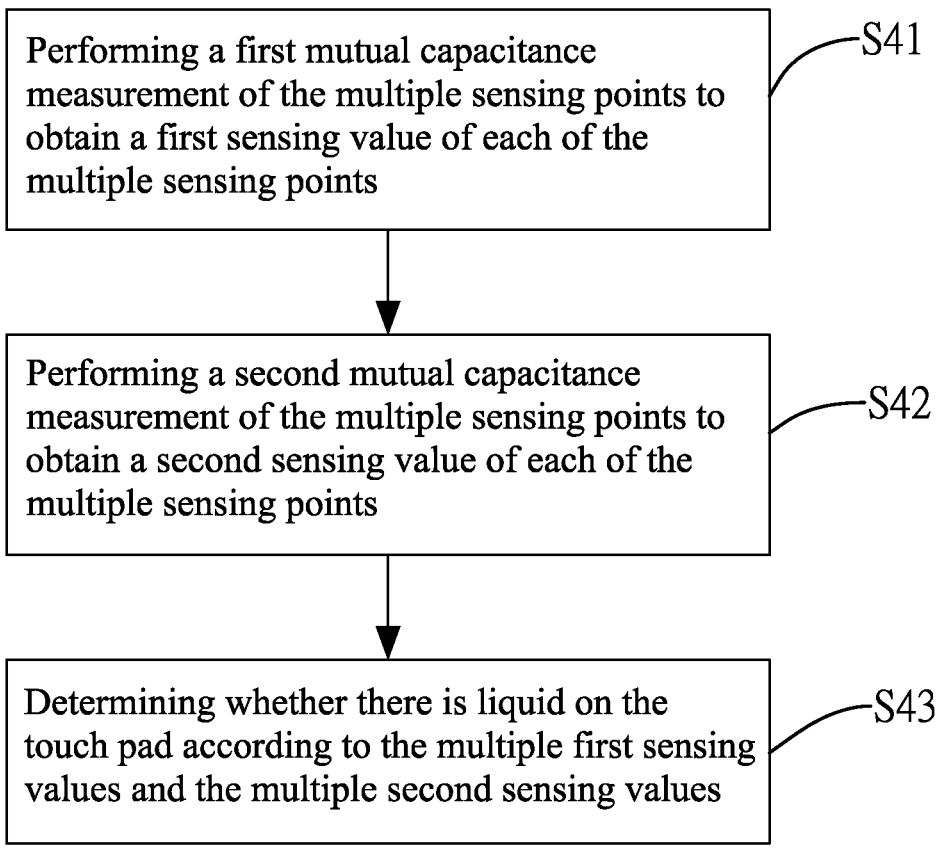
FIG. 4 is flow chart of a method in accordance with the present invention.

The flow chart of FIG. 4 discloses one embodiment of the method in accordance with the present invention for identifying the presence of the liquid 400 on the touch pad 10 in FIG. 3. With reference to FIG. 4, the method of the present invention comprises the steps of:

S41: performing a first mutual capacitance measurement of the multiple sensing points 100 to obtain a first sensing value of each of the multiple sensing points 100;

S42: performing a second mutual capacitance measurement of the multiple sensing points 100 to obtain a second sensing value of each of the multiple sensing points 100, wherein the second mutual capacitance measurement differs from the first mutual capacitance measurement; and S43: determining whether there is liquid on the touch pad 10 according to the multiple first sensing values and the multiple second sensing values.

Figure 5:
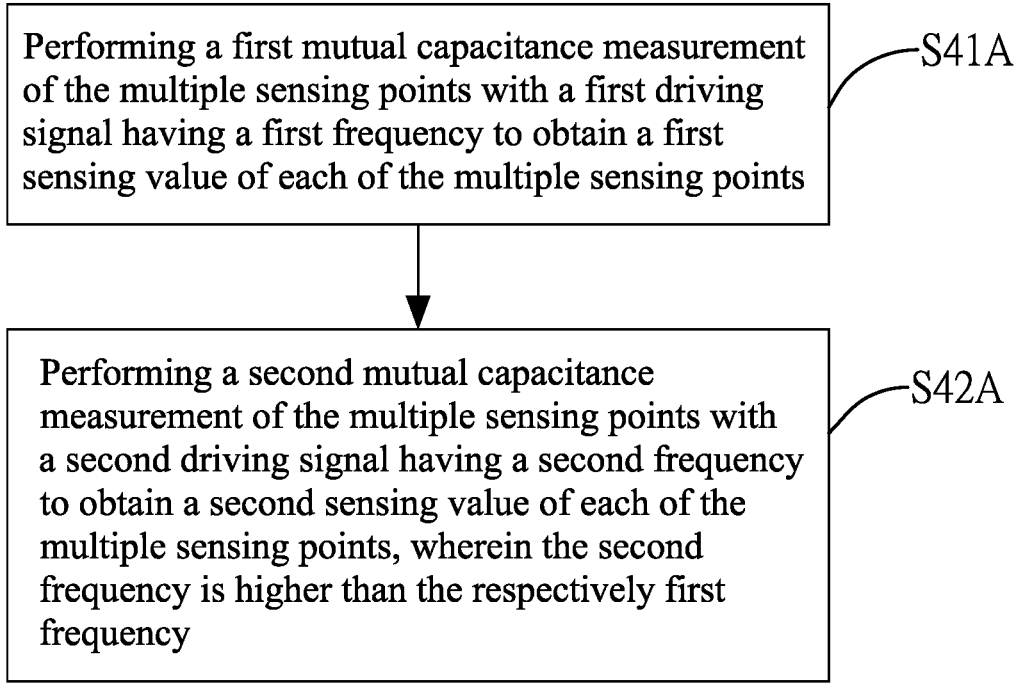
FIG. 5 is a flow chart of a first embodiment of a mutual capacitance measurement in accordance with the present invention.

According to one embodiment, the detail operations of the steps S41 and S42 are shown in steps S41A and S42A of FIG. 5 respectively as below:

S41A: performing a first mutual capacitance measurement of the multiple sensing points 100 with a first driving signal having a first frequency to obtain a first sensing value of each of the multiple sensing points 100; and S42A: performing a second mutual capacitance measurement of the multiple sensing points 100 with a second driving signal having a second frequency to obtain a second sensing value of each of the multiple sensing points 100, wherein the second frequency is higher than the first frequency.

Figure 6A:
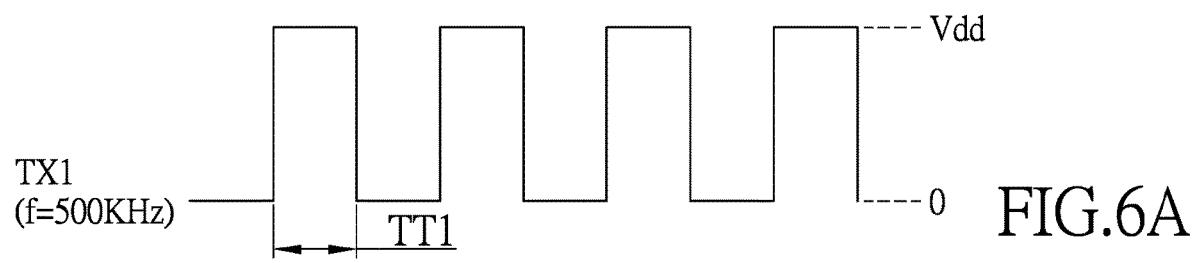
FIGS. 6A-6D show waveforms of a first driving signal TX1, a second driving signal TX2 and controls signals for a switch $SW_2$.
Figure 6B:
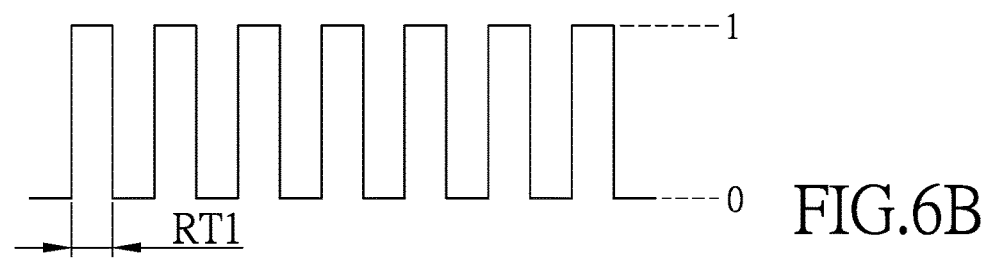
Figure 6C:
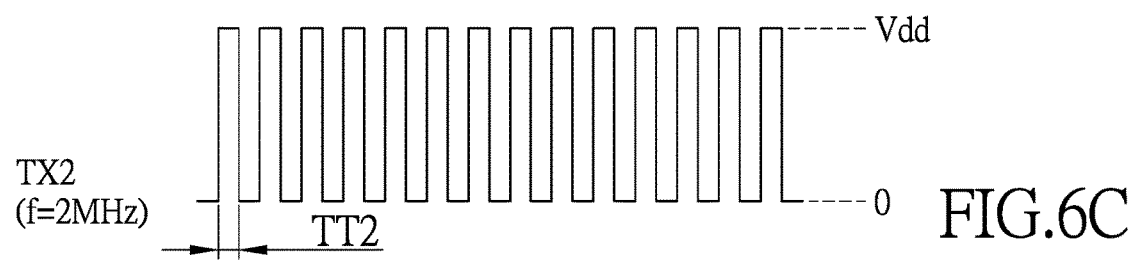
Figure 6D:
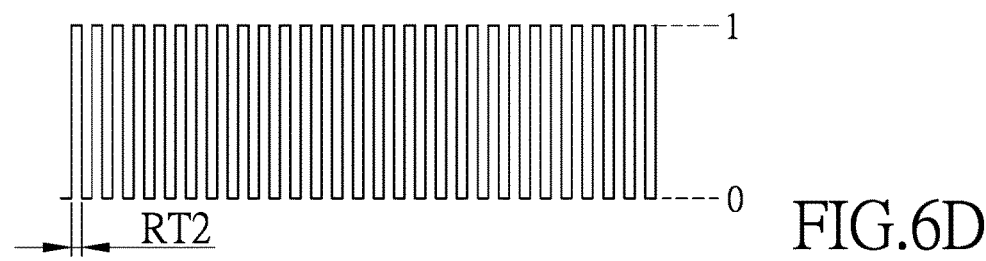

In the step S41A, the first driving signal TX1 according to one embodiment is shown in FIG. 6A, wherein the first frequency of the first driving signal TX1 is 500 KHz and a half cycle of the first driving signal TX1 is TT1. In the first mutual capacitance measurement, a control signal for controlling the switch SW2 has a waveform as shown in FIG. 6B. Each period of time in which the switch SW2 is turned on is a first period RT1. The length of the first period RT1 is less than the half cycle TT1. The first period RT1 can be understood as a time length for sensing a sensing point 100. In step S42A, the second driving signal TX2 according to one embodiment is shown in FIG. 6C, wherein the second frequency of the second driving signal TX2 is 2 MHz and a half cycle of the second driving signal TX2 is TT2. In the second mutual capacitance measurement, a control signal for controlling the switch SW2 has a waveform as shown in FIG. 6D. Each period of time in which the switch SW2 is turned on is a second period RT2. The length of the second period RT2 is less than the TT2, and also less than the first period RT1. The second period RT2 can be understood as a time length for sensing a sensing point 100. In the embodiment of FIGS. 6A to 6D, the first frequency of the first driving signal TX1 is lower than the second frequency of the second driving signal TX2. A sensing time (the first period RT1) corresponding to the first driving signal TX1 is longer than a sensing time (the second period RT2) corresponding to the second driving signal TX2.

Figure 7:
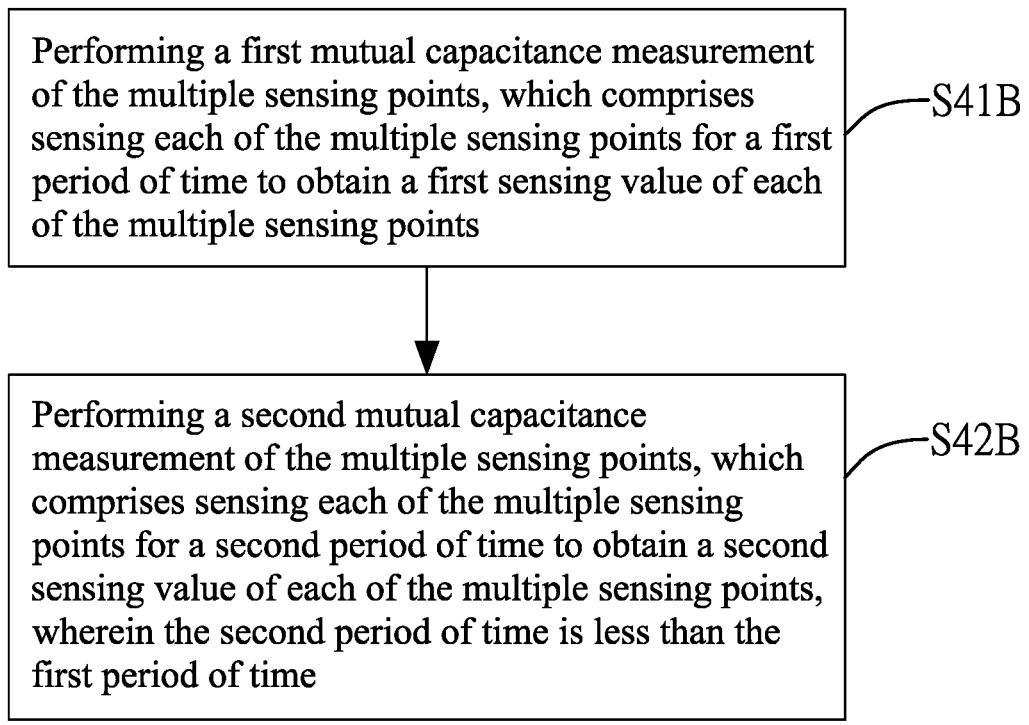
FIG. 7 is a flow chart of a second embodiment of the mutual capacitance measurement in accordance with the present invention.

According to another embodiment, the detail operations of the steps S41 and S42 are shown in steps S41B and S42B of FIG. 7 respectively:

S41B: performing a first mutual capacitance measurement of the multiple sensing points 100, which comprises sensing each of the multiple sensing points 100 for a first period of time to obtain a first sensing value of each of the multiple sensing points 100; and S42B: performing a second mutual capacitance measurement of the multiple sensing points 100, which comprises sensing each of the multiple sensing points 100 for a second period of time to obtain a second sensing value of each of the multiple sensing points 100, wherein the second period of time is less than the first period of time.

Figure 8A:
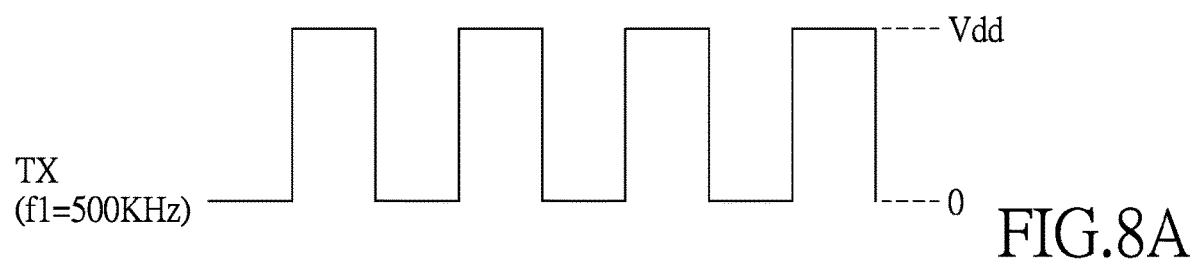
FIGS. 8A-8C shown waveforms of a driving signal TX and control signals for the switch $SW_2$.
Figure 8B:
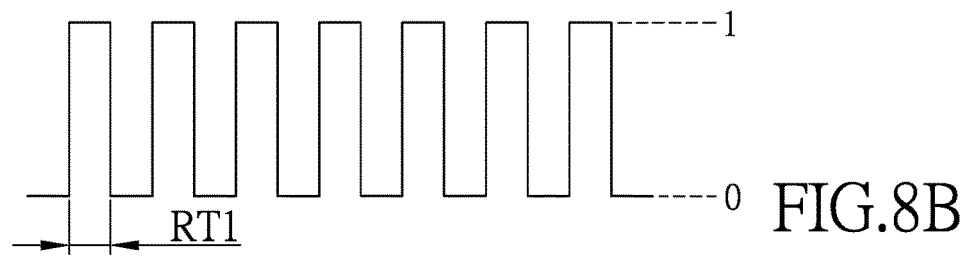

In the step S41B, the driving unit 21 outputs a driving signal TX as shown in FIG. 8A to drive the multiple sensing points 100. The sensing unit 22 senses the first sensing value of each of the multiple sensing points 100. A control signal for controlling the switch $SW_2$ has a waveform as shown in FIG. 8B. When the control signal is "1", the switch $SW_2$ is turned on, and when the control signal is "0", the switch $SW_2$ is open. Each period of time in which the switch $SW_2$ is turned on is a first period RT1. The first period RT1 can be understood as a time length for sensing a sensing point 100. During the first period RT1, the sensing circuit 221 senses a sensing point 100. After the switch $SW_2$ is open, an output voltage obtained from the sample and hold circuit 222 is used to calculate the first sensing value of the sensing point 100.

Figure 8C:
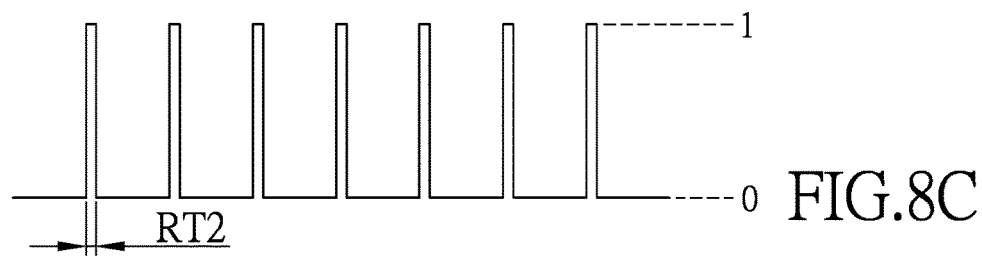

In the step S42B, the driving unit 21 outputs the driving signal TX as shown in FIG. 8A to drive the multiple sensing points 100. In the second mutual capacitance measurement, a control signal for controlling the switch $SW_2$ has a waveform as shown in FIG. 8C. Each period of time in which the switch $SW_2$ is turned on is a second period RT2, and the length of the second period RT2 is less than the first period RT1. The second period RT2 can be understood as a time length for sensing a sensing point 100. During the second period RT2, the sensing circuit 221 senses a sensing point 100. After the switch $SW_2$ is open, an output voltage obtained from the sample and hold circuit 222 is used to calculate the second sensing value of the sensing point 100. By performing the foregoing driving and sensing processes to all the multiple sensing points 100, the second sensing values of all sensing points 100 are obtained. In the embodiment described above, the driving signals used in the first mutual capacitance measurement and the second mutual capacitance measurement have the same frequency. In other embodiment, the driving signals used in the first mutual capacitance measurement and the second mutual capacitance measurement may have different frequencies, and the length of the second period RT2 is still less than the first period RT1. Since the detail operation is similar to the operation described above, it is omitted here.

The first sensing value of each sensing point 100 obtained by performing the first mutual capacitance measurement to the touch pad 10 of FIG. 3 according to the steps S41A or S41B is shown in FIG. 9A. The region 400A corresponds to liquid 400 and another region 300A corresponds to the finger 300. The second sensing value of each sensing point 100 obtained by performing the second mutual capacitance measurement to the touch pad 10 according to the steps S42A or S42B is shown in FIG. 9B. The sensing values obtained through the two different mutual capacitance measurements are obviously different. According to the first sensing values and the second sensing values, step S43 determines whether there is liquid on the touch pad 10, and the determining method is further described as follows.

Figure 10:
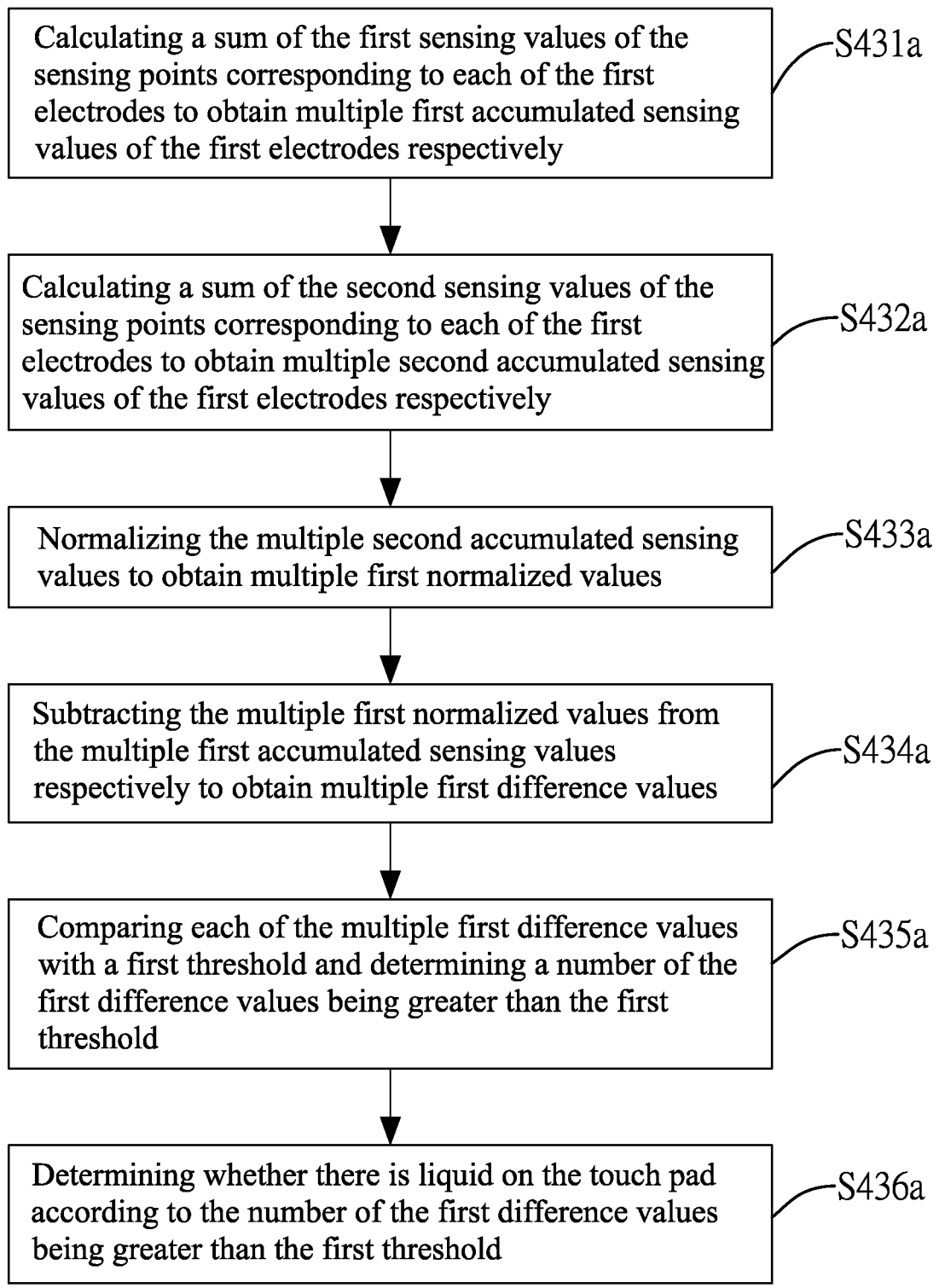
FIG. 10 is a flow chart of a first embodiment of determining whether there is liquid on the touch pad in accordance with the present invention.

An embodiment of step S43 is shown in the flow chart of FIG. 10 and comprises the steps of:

S431a: calculating a sum of the first sensing values of the sensing points on each of the first electrodes X1-X12 to obtain multiple first accumulated sensing values Sum1_X of the first electrodes X1-X12 respectively;

S432a: calculating a sum of the second sensing values of the sensing points 100 on each of the first electrodes X1-X12 to obtain multiple second accumulated sensing values Sum2_X of the first electrodes X1-X12 respectively;

S433a: normalizing the second accumulated sensing values Sum2_X to obtain multiple first normalized values Normalized_Sum2_X;

S434a: subtracting the multiple first normalized values Normalized_Sum2_X from the first accumulated sensing values Sum1_X respectively to obtain multiple first difference values;

S435a: comparing each of the multiple first difference values with a first threshold, and determining a number of the first difference values being greater than the first threshold; and S436a: determining whether there is liquid on the touch pad 10 according to the number of the first difference values being greater than the first threshold.

In the step S431a, the sum of the first sensing values of the sensing points 100 on each of the first electrodes X1-X12 is calculated respectively to obtain the first accumulated sensing values Sum1_X of the first electrodes X1-X12. Taking the first sensing values in FIG. 9A as an example, the first accumulated sensing value Sum1_X of the first electrode X1 is $$0+0+4+4+8+8+0+0=24.$$

The first accumulated sensing value Sum1_X of the first electrode X2 is $$0+(-4)+8+164+356+208+12+4=748,$$

and so on.

The first accumulated sensing values Sum1_X of all the first electrodes X1-X12 can be calculated in the step S431a.

In the step S432a, the sum of the second sensing values of the sensing points 100 on each of the first electrodes X1-X12 is calculated respectively to obtain the second accumulated sensing values Sum2_X of the first electrodes X1-X12. Taking the second sensing values in FIG. 9B as an example, the second accumulated sensing value Sum2_X of the first electrode X1 is $$0+(-4)+8+4+12+0+8+0=28.$$

The second accumulated sensing value Sum2_X of the first electrode X2 is $$0+0+(-28)+12+104+8+(-12)+0=84,$$

and so on.

The second accumulated sensing values Sum2_X of all the first electrodes X1-X12 can be calculated in the step S432a.

In the step S433a, each of the second accumulated sensing values Sum2_X in FIG. 9B is normalized by multiplying a first ratio. In one embodiment, the denominator of the first ratio is the maximum value "1032" among the second accumulated sensing values Sum2_X, and the numerator of the first ratio is the first accumulated sensing value Sum1_X "1788" of the first electrode X6 corresponding to the maximum value "1032", i.e. the first ratio is "1788/1032". By multiplying each of the second accumulated sensing values Sum2_X by the first ratio "1788/1032", all the first normalized values Normalized_Sum2_X are obtained.

In the step S434a, the first normalized values Normalized_Sum2_X are subtracted from the respective first accumulated sensing values Sum1_X to obtain the multiple first difference values. For example, the first accumulated sensing value Sum1_X of the first electrode X1 is 24 and the first normalized value Normalized_Sum2_X of the first electrode X1 is 49, the first difference value of the first electrode X1 is

24−49=−25.

For another example, the first accumulated sensing value Sum1_X of the first electrode X2 is 748 and the first normalized value Normalized_Sum2_X of the first electrode X2 is 146, the first difference value of the first electrode X2 is

748−146=602.

The calculated multiple first difference values of all the first electrode X1-X12 are shown in the following table.

|  | X1 | X2 | X3 | X4 | X5 | X6 | X7 | X8 | X9 | X10 | X11 | X12 |
|---|---|---|---|---|---|---|---|---|---|---|---|---|
| First difference value | −25 | 602 | 2826 | 2225 | 1700 | 0 | −138 | −43 | −7 | −49 | 12 | −21 |

In the step S435a, the multiple first difference values are respectively compared with a first threshold to determine the number of the first difference values being greater than the first threshold. The first threshold can be determined by experimentation or based on requirement for sensitivity or accuracy. If the first threshold is "200", the multiple first difference values of the first electrodes X1-X12 are compared with 200, and it is determined that there are four first electrodes X2, X3, X4 and X5 having first difference values being greater than the first threshold "200". In other words, the number of the first difference values being greater than the first threshold "200" is four.

In the step S436a, whether there is liquid on the touch pad 10 is determined according to the number of the first difference values being greater than the first threshold. In one embodiment of the step S436a, the number of the first difference values being greater than the first threshold is compared with a first default value PS1. If the number is greater than the first default value PS1, it is determined that there is liquid on the touch pad 10. In one embodiment, the first default value PS1 is "0". According to the comparison result of the foregoing step S435a, the number of the first difference values greater than the first threshold "200" is four. Such number is greater than the first default value PS1 "0". As a result, it is determined that there is liquid on the touch pad 10.

Figure 11:
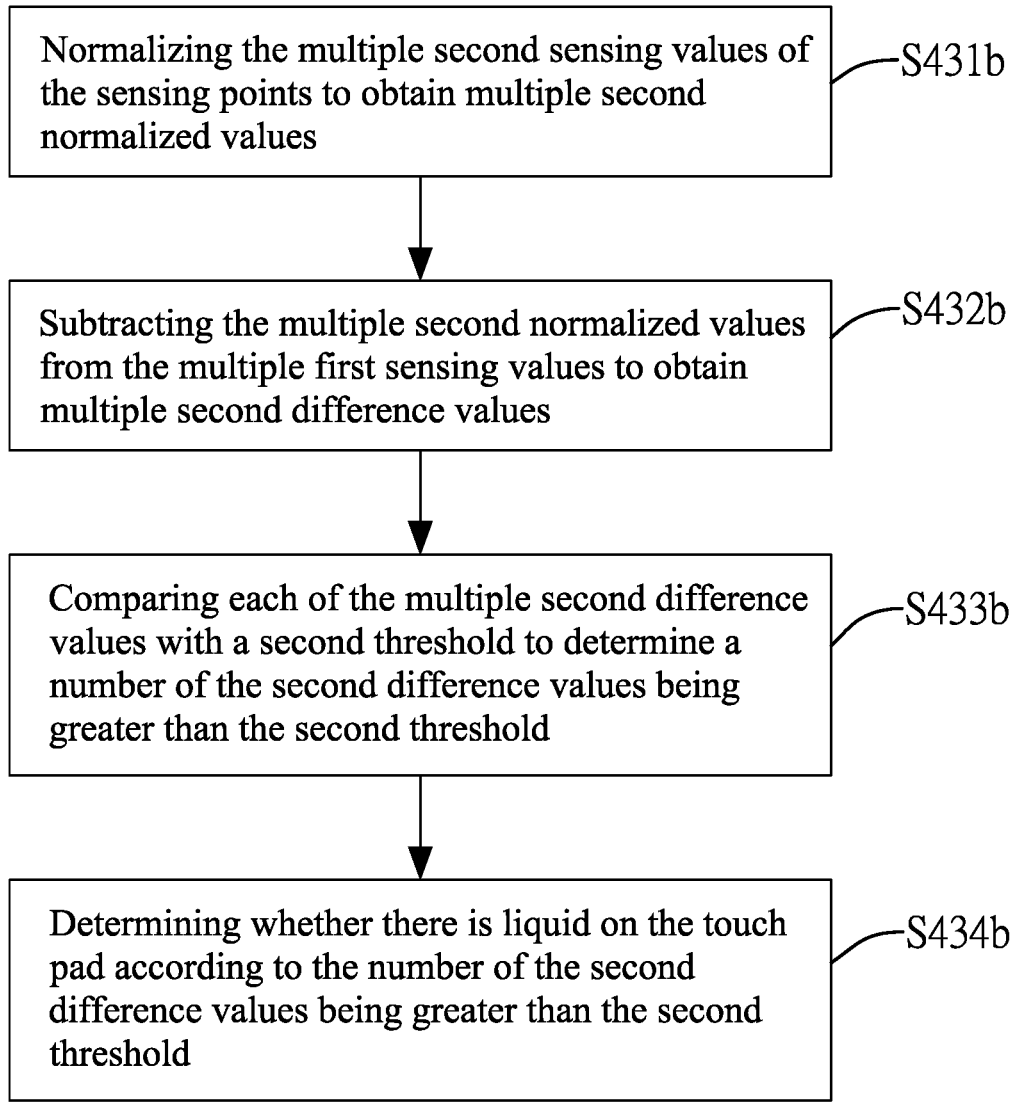
FIG. 11 is a flow chart of a second embodiment of determining whether there is liquid on the touch pad in accordance with the present invention.

The embodiment shown in FIG. 10 determines whether there is liquid on the touch pad 10 according to the sums of the first sensing values and the sums of the second sensing values of the sensing points corresponding to each of the first electrodes X1-X12. In another embodiment, the step S43 comprises steps shown in FIG. 11:

S431b: normalizing the multiple second sensing values of the sensing points 100 to obtain multiple second normalized values;

S432b: subtracting the multiple second normalized values from the multiple first sensing values to obtain multiple second difference values;

S433b: comparing each of the multiple second difference values with a second threshold to determine a number of the second difference values being greater than the second threshold; and S434b: determining whether there is liquid on the touch pad 10 according to the number of the second difference values being greater than the second threshold.

In the step S431b, each of the second sensing values of the sensing points 100 in FIG. 9B is normalized by multiplying by a second ratio, wherein the denominator of the second ratio is the maximum value "416" among the second sensing values, and the numerator of the second ratio is the first sensing value "716" (see FIG. 9A) of the sensing point having the maximum value "416", i.e. the second ratio is "716/416". By multiplying each of the second sensing values by the second ratio "716/416", the second normalized values are obtained as shown in FIG. 12A.

In the step S432b, the multiple second normalized values in FIG. 12A are subtracted from the multiple first sensing values in FIG. 9A of the sensing points 100 to obtain multiple second difference values as shown in FIG. 12B.

In the step S433b, the multiple second difference values in FIG. 12B are compared with a second threshold to determine a number of the second difference values being greater than the second threshold. The second threshold can be determined by experimentation or based on requirement for sensitivity or accuracy. If the second threshold is "300", the multiple second difference values are compared with the second threshold "300", and it is determined that there are twelve second difference values being greater than the second threshold "300". In other words, the number of the second difference values being greater than the second threshold "200" is twelve.

In the step S434b, whether there is liquid on the touch pad 10 is determined according to the number of the second difference values being greater than the second threshold. In one embodiment of the step S434B, the number of the second difference values being greater than the second threshold is compared with a second default value PS2. If the number is greater than the second default value PS2, it is determined that there is liquid on the touch pad 10. In one embodiment, the second default value PS2 is "0". According to the comparison result of the foregoing step S434b, the number of the second difference values greater than the second threshold "300" is twelve. Such number is greater than the second default value PS2 "0". As a result, it is determined that there is liquid on the touch pad 10.

The embodiments described above determine whether there is liquid based on the sensing values of the first electrodes X1-X12 in the X-direction. In other embodiments, it is possible to determine whether there is liquid based on the sensing values of the second electrodes Y1-Y8 in the Y-direction. The method thereof may refer to the steps shown in FIGS. 4, 5, 7, 10 and 11, the detail description is omitted here for brevity.

In other embodiments, according to the multiple first sensing values obtained in step S41 and the multiple second sensing values obtained in step S42, touch information can be generated to indicate whether there is liquid on the touch pad 10. With reference to FIGS. 9A and 9B, as an example, the sensing point 100 at the position (X3, Y5) has the maximum first sensing value 756 in the region 400A and the sensing point 100 at the position (X6, Y5) has the maximum first sensing value 716 in the region 300A. In FIG. 9A, the first sensing value 756 of the sensing point 100 at the position (X3, Y5) is greater than the first sensing value 716 of the sensing point 100 at the position (X6, Y5). However, in FIG. 9B, the second sensing value −28 of the sensing point 100 at the position (X3, Y5) is smaller than the second sensing value 416 of the sensing point 100 at the position (X6, Y5). Based on this characteristic, touch information is generated to indicate that there is liquid on the touch pad 10, or the object corresponding to the region 400A is labeled as the liquid.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A liquid detecting method for a capacitive touch pad, wherein the capacitive touch pad comprises multiple first electrodes and multiple second electrodes, multiple sensing points are formed at intersections of the multiple first electrodes and the multiple second electrodes, the method comprising steps of:
    performing a first mutual capacitance measurement of the multiple sensing points with a first driving signal having a first frequency to obtain a first sensing value of each of the multiple sensing points;
    performing a second mutual capacitance measurement of the multiple sensing points with a second driving signal having a second frequency to obtain a second sensing value of each of the multiple sensing points, the second frequency being higher than the first frequency; and
    determining whether there is liquid on the capacitive touch pad according to the multiple first sensing values and the multiple second sensing values;
    wherein the first driving signal and the second driving signal are provided by a driving unit and used to drive the multiple first electrodes; and
    wherein the first sensing value and the second sensing value of each of the multiple sensing points are obtained by a sensing unit after the sensing unit senses the multiple second electrodes.

2. The method as claimed in claim 1, wherein the step of determining whether there is liquid on the capacitive touch pad comprises steps of:
    calculating a sum of the first sensing values of the sensing points corresponding to each of the multiple first electrodes so as to obtain multiple first accumulated sensing values of the multiple first electrodes respectively;
    calculating a sum of the second sensing values of the sensing points corresponding to each of the multiple first electrodes so as to obtain multiple second accumulated sensing values of the multiple first electrodes respectively;
    normalizing the second accumulated sensing values to obtain multiple first normalized values;
    subtracting the multiple first normalized values from the first accumulated sensing values to obtain multiple first difference values;
    comparing each of the multiple first difference values with a first threshold, and determining a number of the first difference values being greater than the first threshold; and
    determining whether there is liquid on the capacitive touch pad according to the number of the first difference values being greater than the first threshold.

3. The method as claimed in claim 2, wherein the step of normalizing the second accumulated sensing values comprises:
    multiplying each of the second accumulated sensing values with a first ratio, wherein a denominator of the first ratio is a maximum value among the second accumulated sensing values, and a numerator of the first ratio is the first accumulated sensing value of the first electrode corresponding to the maximum value.

4. The method as claimed in claim 1, wherein the step of determining whether there is liquid on the capacitive touch pad comprises steps of:
    normalizing the multiple second sensing values of the multiple sensing points to obtain multiple second normalized values;
    subtracting the multiple second normalized values from the multiple first sensing values to obtain multiple second difference values;
    comparing each of the multiple second difference values with a second threshold to determine a number of the second difference values being greater than the second threshold; and
    determining whether there is liquid on the capacitive touch pad according to the number of the second difference values being greater than the second threshold.

5. The method as claimed in claim 4, wherein the step of normalizing the multiple second sensing values of the multiple sensing points comprises:
    multiplying each of the second sensing values with a second ratio, wherein a denominator of the second ratio is a maximum value among the second sensing values, and a numerator of the second ratio is the first sensing value of the sensing point corresponding to the maximum value.

6. A liquid detecting method for a capacitive touch pad, wherein the capacitive touch pad comprises multiple first electrodes and multiple second electrodes, multiple sensing points are formed at intersections of the multiple first electrodes and the multiple second electrodes; the method comprising steps of:
    performing a first mutual capacitance measurement of the multiple sensing points with a first driving signal, which comprises sensing each of the multiple sensing points for a first period of time to obtain a first sensing value of each of the multiple sensing points;
    performing a second mutual capacitance measurement of the multiple sensing points with a second driving signal, which comprises sensing each of the multiple sensing points for a second period of time to obtain a second sensing value of each of the multiple sensing points, wherein the second period of time is less than the first period of time; and determining whether there is liquid on the capacitive touch pad according to the multiple first sensing values and the multiple second sensing values;

wherein the first driving signal and the second driving signal are provided by a driving unit and used to drive the multiple first electrodes; and wherein the first sensing value and the second sensing value of each of the multiple sensing points are obtained by a sensing unit after the sensing unit senses the multiple second electrodes.

7. The method as claimed in claim 6, wherein the step of determining whether there is liquid on the capacitive touch pad comprises steps of:

calculating a sum of the first sensing values of the sensing points corresponding to each of the multiple first electrodes so as to obtain multiple first accumulated sensing values of the multiple first electrodes respectively;

calculating a sum of the second sensing values of the sensing points corresponding to each of the multiple first electrodes so as to obtain multiple second accumulated sensing values of the multiple first electrodes respectively;

normalizing the second accumulated sensing values to obtain multiple first normalized values;

subtracting the multiple first normalized values from the first accumulated sensing values to obtain multiple first difference values;

comparing each of the multiple first difference values with a first threshold, and determining a number of the first difference values being greater than the first threshold; and determining whether there is liquid on the capacitive touch pad according to the number of the first difference values being greater than the first threshold.

8. The method as claimed in claim 7, wherein the step of normalizing the second accumulated sensing values comprises:

multiplying each of the second accumulated sensing values with a first ratio, wherein a denominator of the first ratio is a maximum value among the second accumulated sensing values, and a numerator of the first ratio is the first accumulated sensing value of the first electrode corresponding to the maximum value.

9. The method as claimed in claim 6, wherein the step of determining whether there is liquid on the capacitive touch pad comprises steps of:

normalizing the multiple second sensing values of the multiple sensing points to obtain multiple second normalized values;

subtracting the multiple second normalized values from the multiple first sensing values to obtain multiple second difference values;

comparing each of the multiple second difference values with a second threshold to determine a number of the second difference values being greater than the second threshold; and determining whether there is liquid on the capacitive touch pad according to the number of the second difference values being greater than the second threshold.

10. The method as claimed in claim 9, wherein the step of normalizing the multiple second sensing values of the multiple sensing points comprises:

multiplying each of the second sensing values with a second ratio, wherein a denominator of the second ratio is a maximum value among the second sensing values, and a numerator of the second ratio is the first sensing value of the sensing point corresponding to the maximum value.

11. A controller for detecting whether there is liquid on a capacitive touch pad, wherein the capacitive touch pad comprises multiple first electrodes and multiple second electrodes, and multiple sensing points are formed at intersections of the multiple first electrodes and the multiple second electrodes; the controller comprising of:

a storage media storing a firmware program;

a processor comprising coupled to the storage media and executing the firmware program to perform steps of:

performing a first mutual capacitance measurement of the multiple sensing points with a first driving signal having a first frequency to obtain a first sensing value of each of the multiple sensing points;

performing a second mutual capacitance measurement of the multiple sensing points with a second driving signal having a second frequency to obtain a second sensing value of each of the multiple sensing points, the second frequency being higher than the first frequency; and determining whether there is liquid on the capacitive touch pad according to the multiple first sensing values and the multiple second sensing values;

wherein the first driving signal and the second driving signal are provided by a driving unit and used to drive the multiple first electrodes; and wherein the first sensing value and the second sensing value of each of the multiple sensing points are obtained by a sensing unit after the sensing unit senses the multiple second electrodes.

12. The controller as claimed in claim 11, wherein the step of determining whether there is liquid on the capacitive touch pad comprises steps of:

calculating a sum of the first sensing values of the sensing points corresponding to each of the multiple first electrodes so as to obtain multiple first accumulated sensing values of the multiple first electrodes respectively;

calculating a sum of the second sensing values of the sensing points corresponding to each of the multiple first electrodes so as to obtain multiple second accumulated sensing values of the multiple first electrodes respectively;

normalizing the second accumulated sensing values to obtain multiple first normalized values;

subtracting the multiple first normalized values from the first accumulated sensing values to obtain multiple first difference values;

comparing each of the multiple first difference values with a first threshold, and determining a number of the first difference values being greater than the first threshold; and determining whether there is liquid on the capacitive touch pad according to the number of the first difference values being greater than the first threshold.

13. The controller as claimed in claim 12, wherein the step of normalizing the second accumulated sensing values comprises:

multiplying each of the second accumulated sensing values with a first ratio, wherein a denominator of the first ratio is a maximum value among the second accumulated sensing values, and a numerator of the first ratio is the first accumulated sensing value of the first electrode corresponding to the maximum value.

14. The controller as claimed in claim 11, wherein the step of determining whether there is liquid on the capacitive touch pad comprises steps of:

normalizing the multiple second sensing values of the multiple sensing points to obtain multiple second normalized values;

subtracting the multiple second normalized values from the multiple first sensing values to obtain multiple second difference values;

comparing each of the multiple second difference values with a second threshold to determine a number of the second difference values being greater than the second threshold; and determining whether there is liquid on the capacitive touch pad according to the number of the second difference values being greater than the second threshold.

15. The controller as claimed in claim 14, wherein the step of normalizing the multiple second sensing values of the multiple sensing points comprises:

multiplying each of the second sensing values with a second ratio, wherein a denominator of the second ratio is a maximum value among the second sensing values, and a numerator of the second ratio is the first sensing value of the sensing point corresponding to the maximum value.

16. A controller for detecting whether there is liquid on a capacitive touch pad, wherein the capacitive touch pad comprises multiple first electrodes and multiple second electrodes, and multiple sensing points are formed at intersections of the multiple first electrodes and the multiple second electrodes; the controller comprising of:

a storage media storing a firmware program;

a processor coupled to the storage media and executing the firmware program to perform steps of:

performing a first mutual capacitance measurement of the multiple sensing points with a first driving signal, which comprises sensing each of the multiple sensing points for a first period of time to obtain a first sensing value of each of the multiple sensing points;

performing a second mutual capacitance measurement of the multiple sensing points with a second driving signal, which comprises sensing each of the multiple sensing points for a second period of time to obtain a second sensing value of each of the multiple sensing points, wherein the second period of time is less than the first period of time; and determining whether there is liquid on the capacitive touch pad according to the multiple first sensing values and the multiple second sensing values;

wherein the first driving signal and the second driving signal are provided by a driving unit and used to drive the multiple first electrodes; and wherein the first sensing value and the second sensing value of each of the multiple sensing points are obtained by a sensing unit after the sensing unit senses the multiple second electrodes.

17. The controller as claimed in claim 16, wherein the step of determining whether there is liquid on the capacitive touch pad comprises steps of:

calculating a sum of the first sensing values of the sensing points corresponding to each of the multiple first electrodes so as to obtain multiple first accumulated sensing values of the multiple first electrodes respectively;

calculating a sum of the second sensing values of the sensing points corresponding to each of the multiple first electrodes so as to obtain multiple second accumulated sensing values of the multiple first electrodes respectively;

normalizing the second accumulated sensing values to obtain multiple first normalized values;

subtracting the multiple first normalized values from the first accumulated sensing values to obtain multiple first difference values;

comparing each of the multiple first difference values with a first threshold, and determining a number of the first difference values being greater than the first threshold; and determining whether there is liquid on the capacitive touch pad according to the number of the first difference values being greater than the first threshold.

18. The controller as claimed in claim 17, wherein the step of normalizing the second accumulated sensing values comprises:

multiplying each of the second accumulated sensing values with a first ratio, wherein a denominator of the first ratio is a maximum value among the second accumulated sensing values, and a numerator of the first ratio is the first accumulated sensing value of the first electrode corresponding to the maximum value.

19. The controller as claimed in claim 16, wherein the step of determining whether there is liquid on the capacitive touch pad comprises steps of:

normalizing the multiple second sensing values of the multiple sensing points to obtain multiple second normalized values;

subtracting the multiple second normalized values from the multiple first sensing values to obtain multiple second difference values;

comparing each of the multiple second difference values with a second threshold to determine a number of the second difference values being greater than the second threshold; and determining whether there is liquid on the capacitive touch pad according to the number of the second difference values being greater than the second threshold.

20. The controller as claimed in claim 19, wherein the step of normalizing the multiple second sensing values of the multiple sensing points comprises:

multiplying each of the second sensing values with a second ratio, wherein a denominator of the second ratio is a maximum value among the second sensing values, and a numerator of the second ratio is the first sensing value of the sensing point corresponding to the maximum value.

* * * * *